United States Patent
Gallo et al.

(10) Patent No.: US 10,393,228 B2
(45) Date of Patent: Aug. 27, 2019

(54) EPICYCLIC REDUCTION UNIT FOR APPLICATIONS WITH AN UPWARD OUTPUT

(71) Applicant: COMER INDUSTRIES S.P.A., Milan (IT)

(72) Inventors: Andrea Gallo, Reggio Emilia (IT); Stefano Frascari, Castelnovo di Sotto (IT)

(73) Assignee: COMER INDUSTRIES S.P.A., Milan (IT)

( * ) Notice: Subject to any disclaimer, the term of this patent is extended or adjusted under 35 U.S.C. 154(b) by 309 days.

(21) Appl. No.: 15/525,143

(22) PCT Filed: Nov. 5, 2015

(86) PCT No.: PCT/EP2015/075824
§ 371 (c)(1),
(2) Date: May 8, 2017

(87) PCT Pub. No.: WO2016/071452
PCT Pub. Date: May 12, 2016

(65) Prior Publication Data
US 2018/0283501 A1    Oct. 4, 2018

(30) Foreign Application Priority Data
Nov. 7, 2014 (IT) .............................. MO2014A0323

(51) Int. Cl.
*F16H 1/28* (2006.01)
*F16H 1/46* (2006.01)
*F16H 57/08* (2006.01)

(52) U.S. Cl.
CPC ................. *F16H 1/46* (2013.01); *F16H 1/28* (2013.01); *F16H 57/082* (2013.01)

(58) Field of Classification Search
CPC .................................. F16H 1/28; F16H 57/082
See application file for complete search history.

(56) References Cited

U.S. PATENT DOCUMENTS

| | | | |
|---|---|---|---|
| 5,704,864 A | 1/1998 | Yanagisawa | |
| 6,090,006 A * | 7/2000 | Kingston | B60K 17/046 180/372 |
| 9,388,880 B2 | 7/2016 | Shizu et al. | |

FOREIGN PATENT DOCUMENTS

| | | |
|---|---|---|
| CN | 102022287 A | 4/2011 |
| DE | 202008017994 U1 | 3/2011 |
| WO | 2014069646 A1 | 5/2014 |

OTHER PUBLICATIONS

Written Opinion and Search Report of International Application No. PCT/EP2015/075824; dated Feb. 3, 2016; 8 pages.

* cited by examiner

*Primary Examiner* — Erin D Bishop
(74) *Attorney, Agent, or Firm* — Brooks Kushman P.C.

(57) ABSTRACT

An epicyclic reduction unit for applications with an upward output, which comprises a casing for containing at least one first epicyclic reduction stage that is interposed between an input actuation unit and an output shaft that is arranged in an upper region, the first stage being composed of a driving sun gear that rotates about a main rotation axis that is vertical and a ring gear that is integral with the casing, between which a plurality of planet gears is engaged which are supported in rotation about their own longitudinal axis and about the rotation axis by a driven planet carrier, which in turn rotates about the rotation axis, means being provided for connecting by suspension at least the planet carrier of the first stage to the output shaft, the sun gear of the first stage resting on the input actuation unit, which actuates it in rotation about the rotation axis.

10 Claims, 6 Drawing Sheets

EPICYCLIC REDUCTION UNIT FOR APPLICATIONS WITH AN UPWARD OUTPUT

CROSS-REFERENCE TO RELATED APPLICATION

This application is the U.S. national phase of PCT Application No. PCT/EP2015/075824 filed on Nov. 5, 2015, which claims priority to Italian Patent Application No. MO2014A000323 filed on Nov. 7, 2014, the disclosures of which are incorporated in their entirety by reference herein.

The present invention relates to an epicyclic reduction unit for applications with an upward output.

Epicyclic reduction units are known in which one or more epicyclic reduction stages in series are interposed between a fast input shaft and a slow output shaft.

Each epicyclic stage comprises a sun gear that is turned about a main rotation axis by an upstream element and a fixed ring gear that is coaxial to the sun gear, between which a plurality of sun gears are engaged which are supported so as to rotate about their respective axes and about the main rotation axis by a planet carrier, which in turn rotates about the main rotation axis and is integral in rotation with a downstream element.

In some applications the main rotation axis is extended in a vertical direction and the output shaft is arranged in an upward region.

This situation occurs for example in pumps for concrete or in installations in which the reduction unit turns mixing elements, such as in mixing trucks or in apparatuses for generating biogas.

In these conditions the stem of the sun gear of the first reduction stage is inserted in a corresponding slot provided in the rotary actuation elements at the input, resting thereon with the interposition of an elastic ring, which protrudes radially from said stem and onto which the weight of the reduction stages is discharged.

Typically, at the input, an input shaft is provided with a horizontal arrangement, which turns the sun gear of the first stage by way of the interposition of a bevel gear pair. The stem of the sun gear is therefore partially inserted in the hub of the bevel ring gear and rests thereon by means of the abutment defined by the elastic ring.

Since the axial plays are recovered by the weight of the system and the axial movements are prevented when the system is under torque, said elastic ring is a highly stressed component due to the flexing of the bevel ring gear, and in some conditions may even break.

This phenomenon is all the more frequent as the weight of the epicyclic stages increases (large sizes) and as the stress on the transmission increases (high torques).

In any case, this problem is present also when the input shaft is coaxial to the main rotation axis, since any axial thrusts generated in operation, due to imprecisions or deformations of the system, are discharged onto the input.

It is therefore evident that these epicyclic reduction units of a known type are not devoid of drawbacks, which include the fact that the intense stress to which the elastic ring is subjected makes it a critical component of the system, which penalizes its reliability and durability.

In case of breakage of the elastic supporting ring of the reduction stages, onerous interventions are in fact required for its replacement which cause a period of inactivity of the apparatuses in which the reduction unit is installed.

Furthermore, the fact that the weight of the reduction stages and any axial stresses are discharged onto the actuation elements in input can cause a malfunction and deterioration thereof.

The aim of the present invention is to eliminate the drawbacks described above the background art, by devising an epicyclic reduction unit for applications with an upward output in which the weight of the epicyclic stages does not bear on the actuation elements in input.

Within this aim, an object of the present invention is to prevent any loads generated in the system due to deformations under load or imprecisions in the sets of teeth from bearing on the actuation elements in input.

A further object of the present invention is to provide a connection of the sun gear of the first reduction stage to the actuation elements in input that avoids the use of elastic rings and allows to better absorb any misalignments between the crown of the bevel gear pair and the main rotation axis of the reduction stages if the input shaft is horizontal.

Another object of the present invention is to devise a structure that is simple, relatively easy to provide in practice, safe in use, effective in operation, and relatively low in cost.

This aim and these and other objects that will become more apparent hereinafter are achieved by the present epicyclic reduction unit for applications with an upward output, comprising a casing for containing at least one first epicyclic reduction stage that is interposed between an input actuation unit and an output shaft that is arranged in an upper region, said first stage comprising a driving sun gear that rotates about a main rotation axis that is substantially vertical and a ring gear that is integral with said casing, between which a plurality of planet gears is engaged which are supported in rotation about their own longitudinal axis and about said rotation axis by a driven planet carrier, which in turn rotates about said rotation axis, characterized in that it comprises means for connecting by suspension at least the planet carrier of said first stage to said output shaft, the sun gear of said first stage resting on said input actuation unit, which actuates it in rotation about said rotation axis.

Further characteristics and advantages of the present invention will become better apparent from the detailed description of some preferred but not exclusive embodiments of an epicyclic reduction unit for applications with an upward output, illustrated by way of nonlimiting example in the accompanying drawings, wherein.

Figure 1:
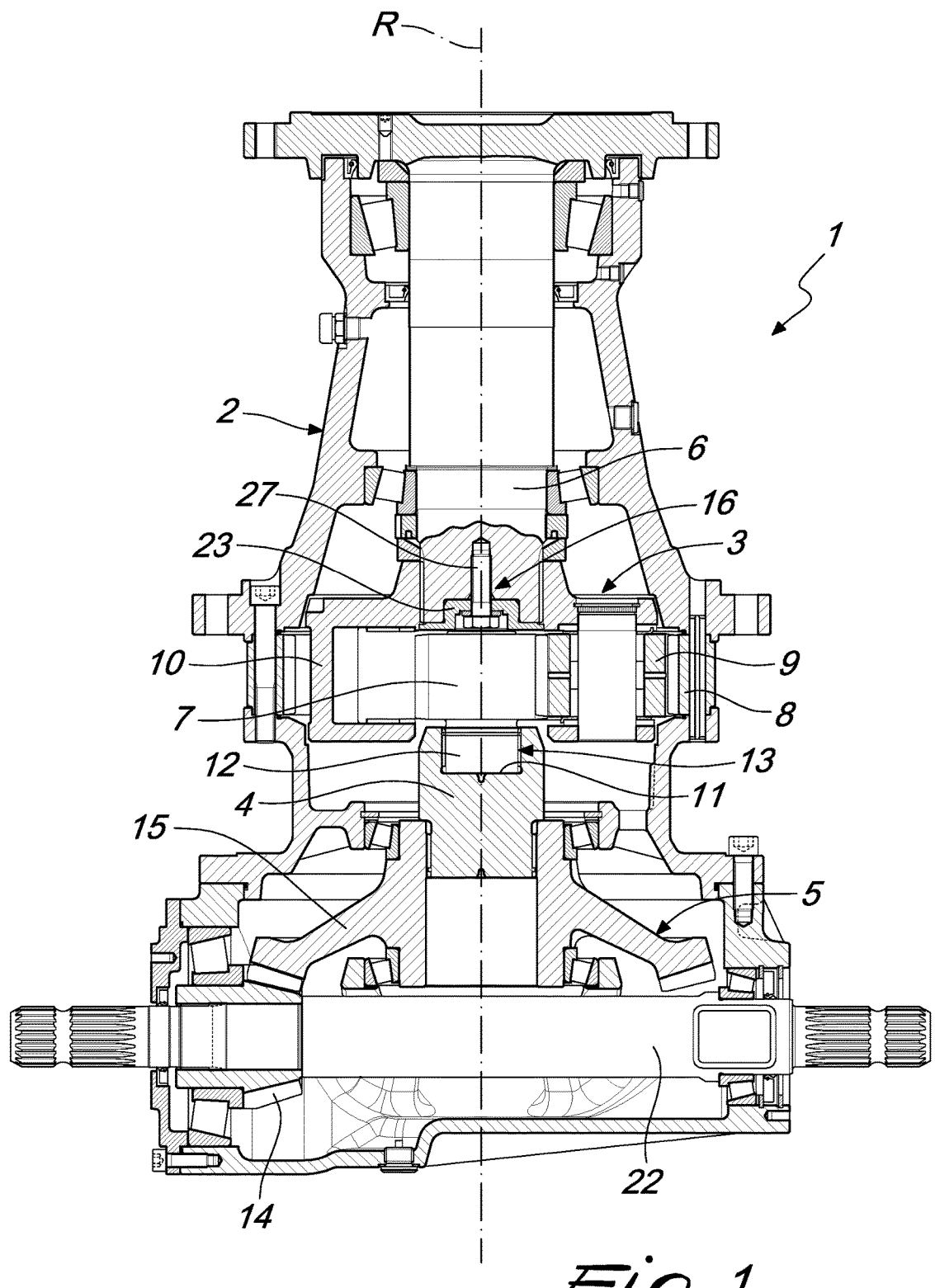
FIG. 1 is a schematic sectional view, taken along a plane that passes through the main rotation axis of a first embodiment of an epicyclic reduction unit for applications with an upward output, according to the invention.

With reference to the figures, the numeral 1 generally designates an epicyclic reduction unit for applications with an upward output according to the invention.

The reduction unit 1 comprises a casing 2 for containing at least one first epicyclic reduction stage 3 that is interposed between an input actuation unit 5 and an output shaft 6 that is arranged in an upper region.

The first stage 3 comprises a driving sun gear 7, which rotates about a main rotation axis R, which is coaxial to the output shaft 6 and is substantially vertical, and a ring gear 8, which is integral with the casing 2, between which a plurality of planet gears 9 is engaged which are supported in rotation about their own longitudinal axes and about the rotation axis R by a driven planet carrier 10, which in turn rotates about the rotation axis R.

The planet gears 9 are distributed symmetrically around the rotation axis R. In the embodiments shown three planet gears 9 are provided, only one of which is visible in the figures.

The sun gear 7 discharges its own weight onto the input actuation unit 5, which turns it about the rotation axis R.

Usefully, a sleeve-like connecting joint 4 is provided that is interposed between the stem 12 of the sun gear 7 and the input actuation unit 5, which allows to absorb any misalignments caused by construction imprecisions and/or deformations under load.

The connecting joint 4 comprises in an upper region an axial seat 11 in which the stem 12 is inserted. Side-fit coupling elements 13 are interposed between the stem 12 and the side wall of the axial seat 11 to turn the sun gear 7.

In turn, the connecting joint 4 is actuated rotationally by the elements of the input actuation unit 5 to which it is coupled.

Figure 4:
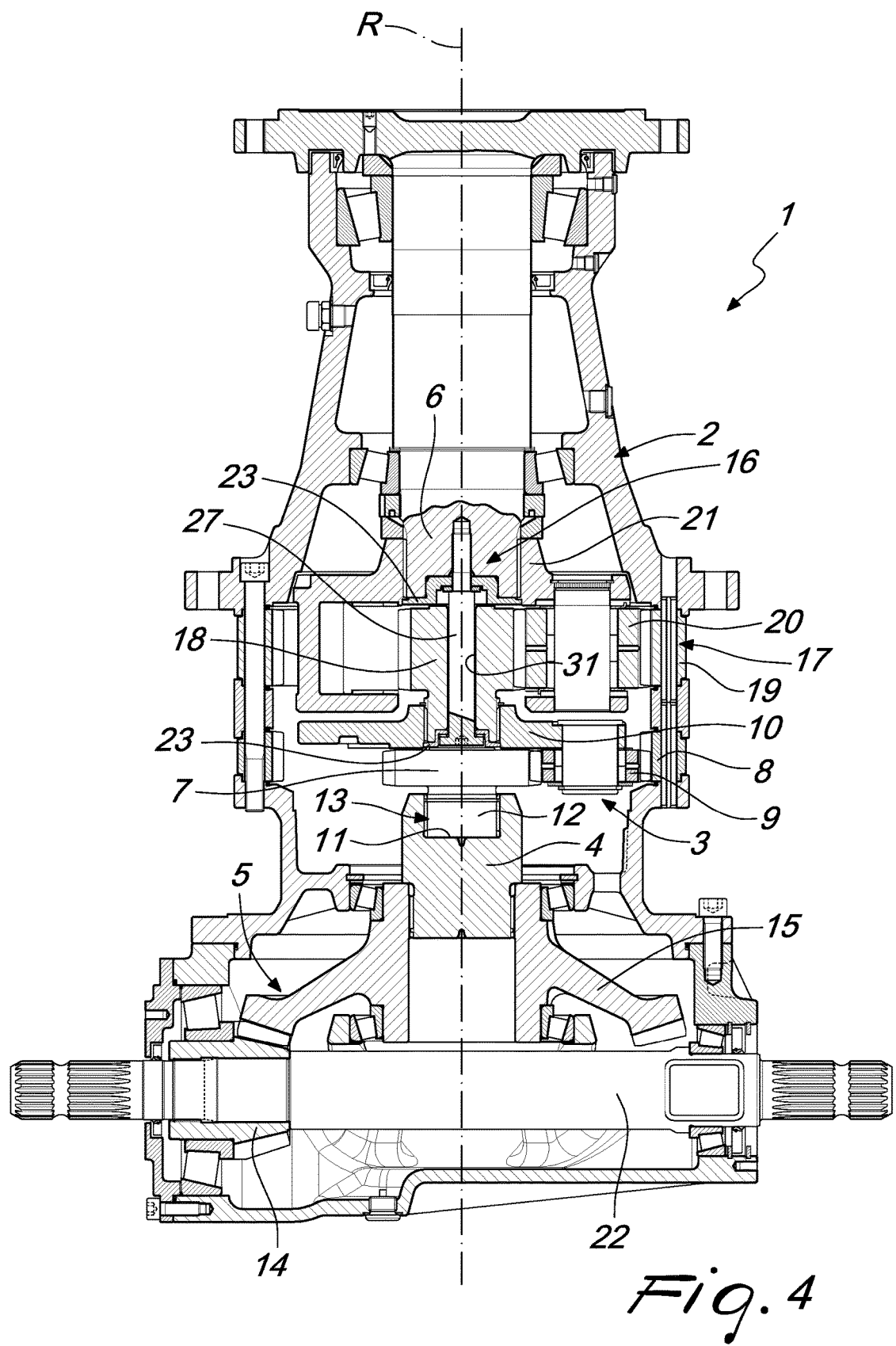
FIG. 4 is a schematic sectional view, taken along a plane that passes through the main rotation axis, of a third embodiment of the reduction unit according to the invention.

FIGS. 1 and 4 show embodiments in which the input actuation unit 5 has an input shaft 22 with a horizontal arrangement and a bevel pinion 14 is provided that is integral with said shaft and is coupled to a bevel crown gear 15 that rotates about the rotation axis R, in the hub of which the connecting joint 4 for rotation is engaged.

Figure 3:
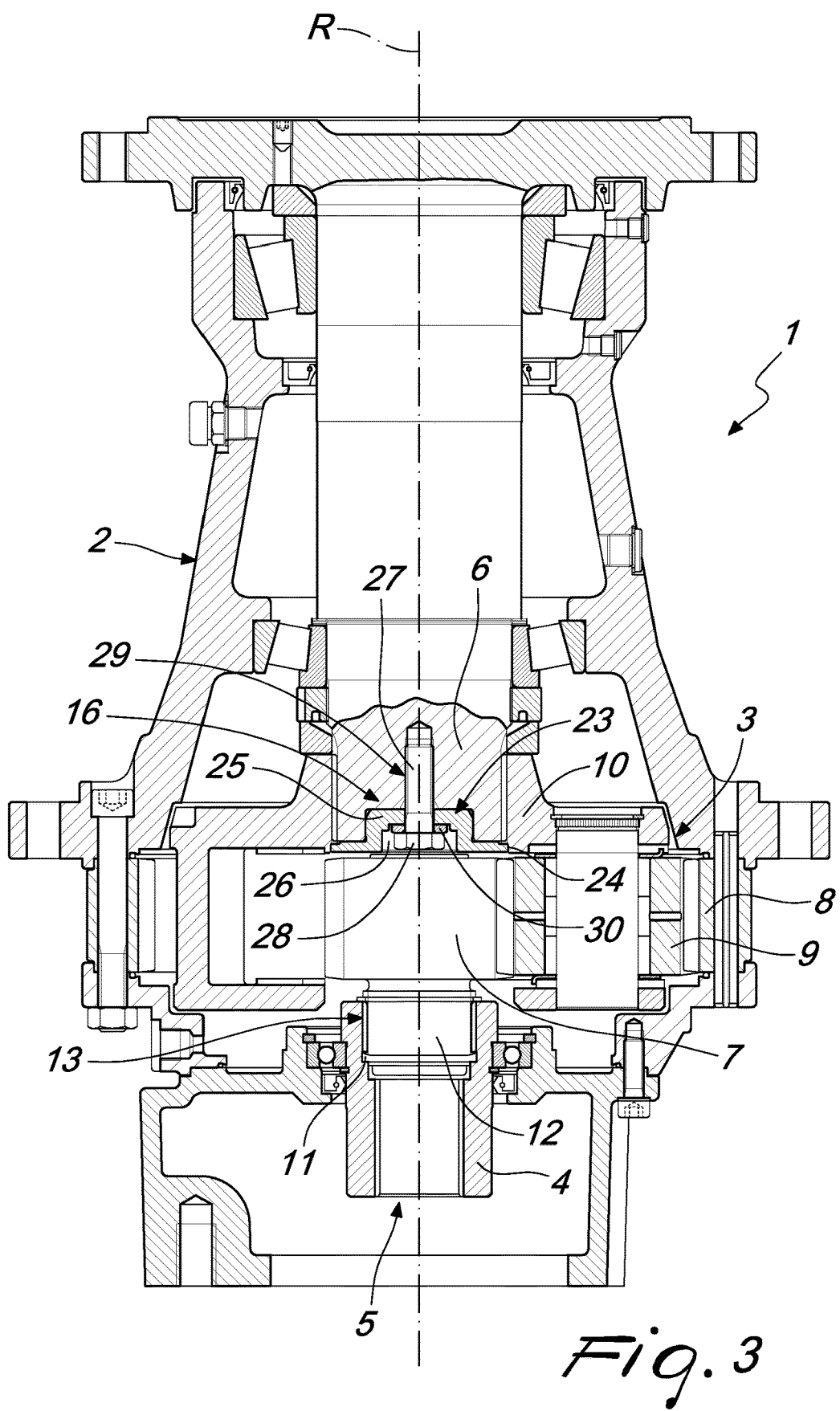
FIG. 3 is a schematic sectional view, taken along a plane that passes through the main rotation axis, of a second embodiment of the reduction unit according to the invention.
Figure 6:
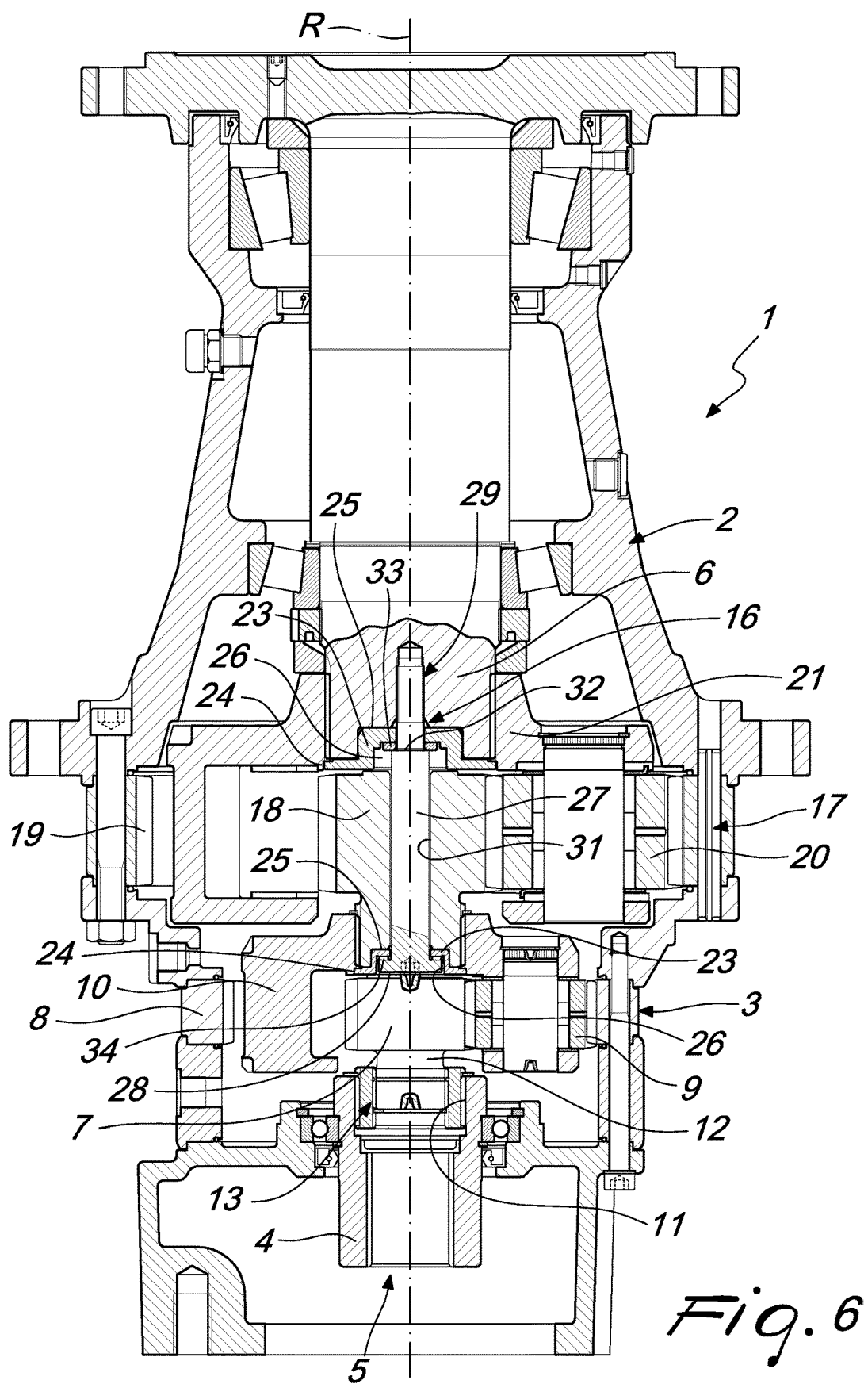
FIG. 6 is a schematic sectional view, taken along a plane that passes through the main rotation axis, of a fourth embodiment of the reduction unit according to the invention.

FIGS. 3 and 6 instead show alternative embodiments in which the input actuation unit 5 has an input shaft (not shown) that is coaxial to the rotation axis R and the connecting joint 4 is axially hollow, so that it is possible to key in its lower part the upper end of the input shaft for rotation.

According to the invention, the reduction unit 1 is provided with means 16 for connection by suspension of at least the planet carrier 10 of the first reduction stage 3 to the output shaft 6.

In this manner, the weight of the planet carrier 10 and of the planet gears 9 supported thereby does not bear on the input actuation unit 5 and any axial loads developed during operation are not discharged onto it.

Therefore, only the sun gear 7 remains resting on the input actuation unit 5.

Indeed for this reason, the sun gear 7 might also rest directly on the input actuation unit 5 by way of the interposition of an elastic ring as used in known solutions; however, it is preferable to interpose the connecting joint 4 described above.

The reduction unit 1 can comprise at least one secondary reduction stage 17 downstream of the first stage 3. The at least one secondary stage 17, also, comprises a driving sun gear 8 that rotates about the rotation axis R and a ring gear 19 that is integral with the casing 2, between which a plurality of planet gears 20 are engaged which are supported rotationally about their own longitudinal axes and about the rotation axis R by a driven planet carrier 21, which in turn rotates about the rotation axis R.

The planet gears 20 are distributed symmetrically around the rotation axis R. In the embodiments shown three planet gears 20 are provided, only one of which is visible in the figures.

It is possible to provide a plurality of secondary stages 17 arranged in series to each other downstream of the first stage 3.

In this case, the means 16 for connection by suspension connect to the output shaft 6 also the sun gear 18 and the planet carrier 21 of the at least one secondary stage 17, so that their weight, together with the weight of the planet gears 20 associated with the planet carrier 21, is supported by the output shaft 6 and does not bear on the input actuation unit 5.

In greater detail, the means 16 for connection by suspension comprise at least one plate 23 that is connected to the output shaft 6 and has a peripheral portion 24 that protrudes radially to support a corresponding planet carrier. The planet carrier is in fact usually provided with a hub that has axial teeth for side-fit connection to the downstream element in the kinematic chain and the peripheral portion 24 is adapted to be arranged below such teeth in order to support the planet carrier.

Moreover, the plate 23 comprises a central portion 25 that is raised with respect to the peripheral portion 24 so as to define axially a recess 26.

Preferably, the means 16 for connection by suspension provide a stem 27 for connection of the at least one plate 23 to the output shaft 6, which is arranged vertically along the rotation axis R and has the lower end associated with an expanded head 28 to retain the supporting plate 23 of the planet carrier 10 of the first stage 3 and the upper end connected to the output shaft 6, for example by means of a threaded coupling 29.

The head 28 is accommodated in the recess 26 of the supporting plate 23 of the planet carrier 10 of the first stage 3, so as to not protrude axially below it and so as to not interfere with the outline of the sun gear 7.

Figure 2:
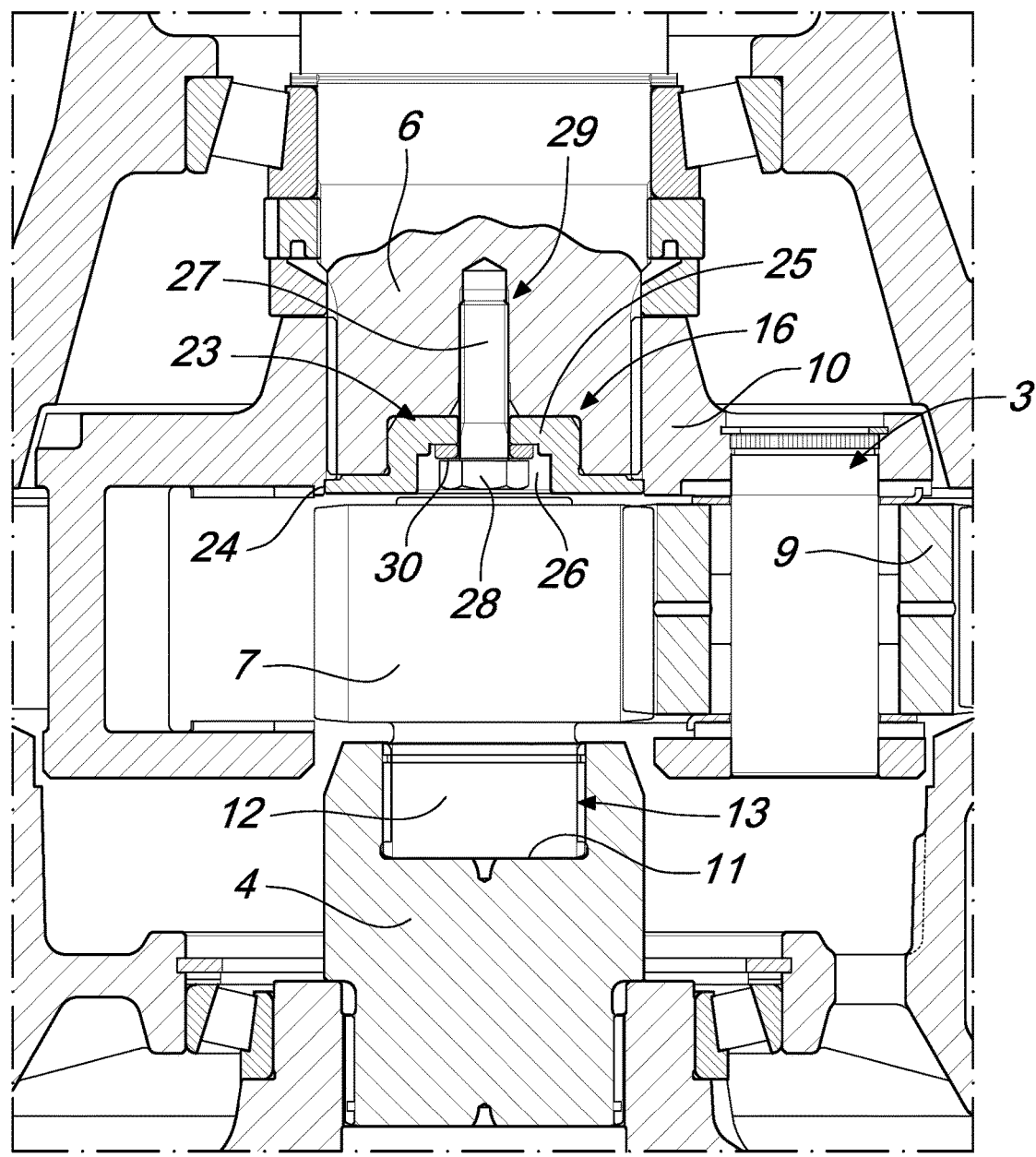
FIG. 2 is a schematic enlarged-scale view of a detail related to the means for connection by suspension shown in FIG. 1.

In the embodiments according to FIGS. 1-3, the reduction unit 1 has a single reduction stage.

In this case, the means 16 for connection by suspension provide a single plate 23 that is arranged below the hub of the planet carrier 10. Preferably, a fastening washer 30 is provided between the head 28 and the plate 23.

Figure 5:
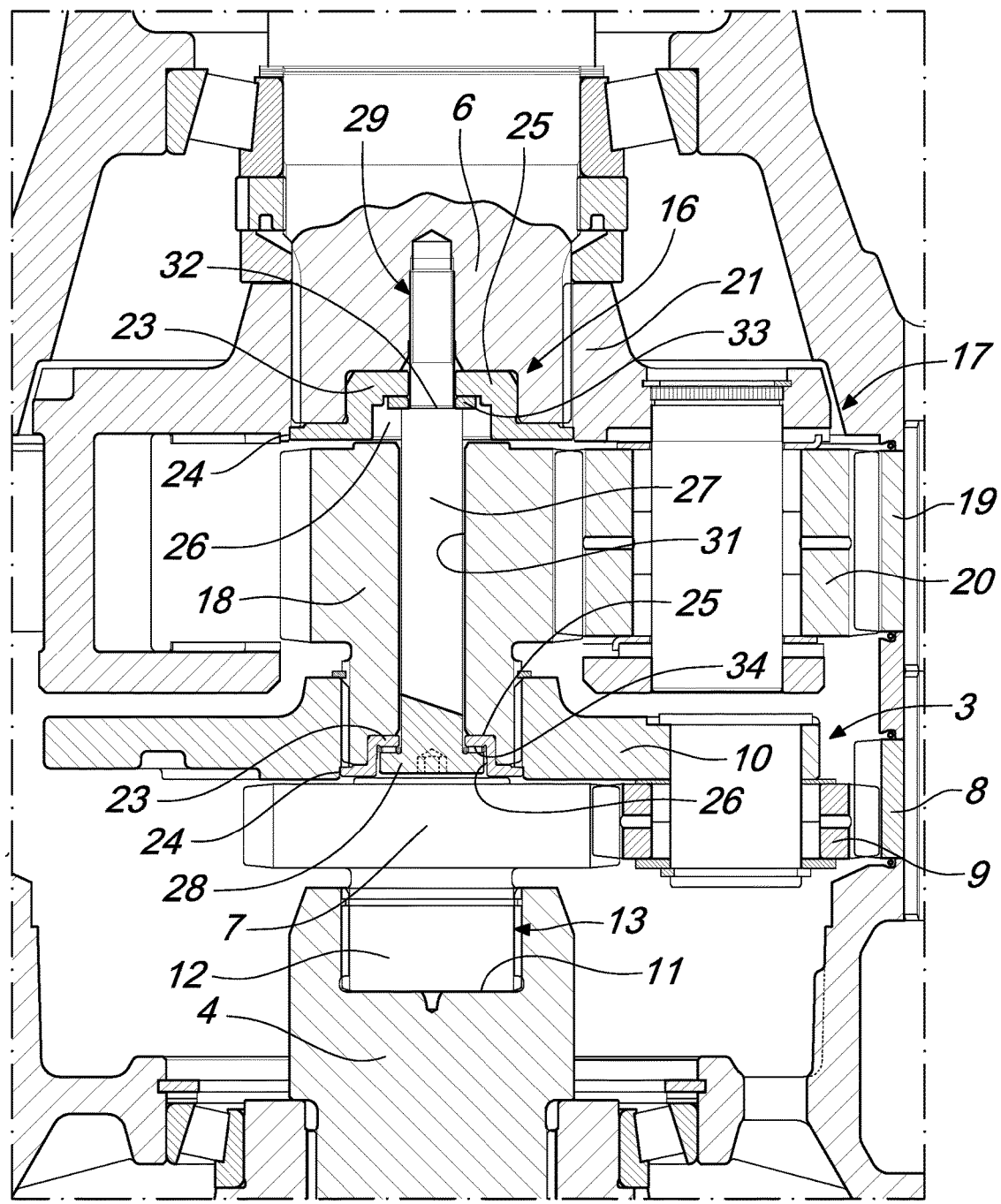
FIG. 5 is a schematic enlarged-scale view of a detail related to the means for connection by suspension shown in FIG. 4.

In the embodiments according to FIGS. 4-6, the reduction unit 1 has a secondary stage 17 downstream of the first stage 3. In this case, the means 16 for connection by suspension comprise a plate 23 for each reduction stage 3, 17 that is arranged below the hub of the respective planet carrier 10, 21. The stem 27 is inserted so as to pass through an axial hole 31 that is defined in the sun gear 18 of the secondary stage 17 and has a shoulder 32 for retaining the supporting plate 23 of the planet carrier 21 of the secondary stage 17.

Furthermore, a fastening washer 33 is provided that is interposed between the shoulder 32 and the plate 23 for supporting the planet carrier 21 of the secondary stage 17 and a rolling element 34, of the type of an axial roller bearing, which is interposed between the head 28 and the plate 23 for supporting the planet carrier 10 of the first stage 3.

In this manner, the stem 27 rotates integrally with the planet carrier 21 of the secondary stage 17 and with the output shaft 6 and is rotationally uncoupled from the planet carrier 10 of the first stage 3.

If there is a plurality of secondary stages 17 arranged in series downstream of the first stage 3, the means 16 for connection by suspension provide a plate 23 for each planet carrier 21 and a stem 27 provided with corresponding shoulders 32, there being further respective rolling elements 34 interposed between the shoulders 32 and the plates 23 related to the intermediate stages.

Operation of the reduction unit according to the present invention is fully equivalent to that of known epicyclic reduction units, with the advantages described above.

In practice it has been found that the described invention achieves the intended aim and objects and in particular the fact is stressed that the reduction unit according to the invention allows to avoid the overload of the input actuation unit, avoiding breakages and malfunctions thereof.

It is also possible to avoid the transfer to the input actuation unit of loads generated as a consequence of imprecisions in construction or deformations of the components of the gear system under stress during use.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements without thereby abandoning the protective scope of the appended claims.

The disclosures in Italian Patent Application No. MO2014A000323 (102014902307751) from which this application claims priority are incorporated herein by reference.

The invention claimed is:

1. An epicyclic reduction unit for applications with an upward output, the reduction unit comprising:
    a casing for containing at least one first epicyclic reduction stage that is interposed between an input actuation unit and an output shaft that is arranged in an upper region, the first stage comprising a driving sun gear that rotates about a main rotation axis that is substantially vertical and a ring gear that is integral with the casing, between which a plurality of planet gears is engaged which are supported in rotation about their own longitudinal axis and about the rotation axis by a driven planet carrier, which in turn rotates about the rotation axis;
    means for connecting by suspension at least the planet carrier of the first stage to the output shaft, the sun gear of the first stage resting on the input actuation unit, which actuates it in rotation about the rotation axis.

2. The reduction unit according to claim 1, further comprising at least one secondary epicyclic reduction stage, which is arranged downstream of the first stage and comprises a driving sun gear that rotates about a substantially vertical main rotation axis and a ring gear that is integral with the casing and between which a plurality of planet gears is engaged which are supported in rotation about their own longitudinal axis and about the rotation axis by a driven planet carrier, which in turn rotates about the rotation axis, and wherein the means for connection by suspension connect to the output shaft also the sun gear and the planet carrier of the at least one secondary stage.

3. The reduction unit according to claim 2, wherein the means for connection by suspension comprise at least one plate that is connected to the output shaft and has a peripheral portion that protrudes radially to support a corresponding planet carrier.

4. The reduction unit according to claim 3, wherein the planet carrier comprises a hub provided internally with axial teeth for side-fit connection to the downstream element, the peripheral portion being arranged below the teeth.

5. The reduction unit according to claim 3, wherein the at least one plate comprises a central portion that is raised with respect to the peripheral portion so as to define axially a recess.

6. The reduction unit according to claim 3, wherein the means for connection by suspension comprise a connection stem, which is inserted so as to pass through an axial hole that is defined in the at least one plate and has an upper end connected to the output shaft and a lower end associated with an expanded head to retain the supporting plate of the planet carrier of the first stage.

7. The reduction unit according to claim 6, wherein the head is accommodated in the recess of the supporting plate of the planet carrier of the first stage.

8. The reduction unit according to claim 6, wherein the connection stem is inserted so as to pass through an axial hole defined in the sun gear of the at least one secondary stage and has at least one shoulder for retention of a corresponding supporting plate of the planet carrier of the at least one secondary stage.

9. The reduction unit according to claim 6, wherein the means for connection by suspension comprise at least one rolling element or at least one fastening washer that is interposed between the stem and the at least one plate.

10. The reduction unit according to claim 1, further comprising a connecting joint that is interposed between the driving sun gear of the first stage and the input actuation unit.

* * * * *